United States Patent
Mino et al.

(10) Patent No.: US 12,438,139 B2
(45) Date of Patent: Oct. 7, 2025

(54) POSITIVE ELECTRODE SLURRY, POSITIVE ELECTRODE, SECONDARY BATTERY, AND POSITIVE ELECTRODE MANUFACTURING METHOD

(71) Applicant: Panasonic Intellectual Property Management Co., Ltd., Osaka (JP)

(72) Inventors: Shinji Mino, Osaka (JP); Eisuke Sato, Osaka (JP); Yoshinori Sakai, Hyogo (JP); Kazutoshi Utsumiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 664 days.

(21) Appl. No.: 17/415,224

(22) PCT Filed: Nov. 29, 2019

(86) PCT No.: PCT/JP2019/046699
§ 371 (c)(1),
(2) Date: Jun. 17, 2021

(87) PCT Pub. No.: WO2020/137349
PCT Pub. Date: Jul. 2, 2020

(65) Prior Publication Data
US 2022/0069272 A1 Mar. 3, 2022

(30) Foreign Application Priority Data
Dec. 28, 2018 (JP) ................. 2018-246688

(51) Int. Cl.
*H01M 4/04* (2006.01)
*H01M 4/02* (2006.01)
(Continued)

(52) U.S. Cl.
CPC ......... *H01M 4/0416* (2013.01); *H01M 4/364* (2013.01); *H01M 2004/028* (2013.01);
(Continued)

(58) Field of Classification Search
CPC ................. H01M 2004/028; H01M 10/0525
See application file for complete search history.

(56) References Cited

U.S. PATENT DOCUMENTS 5,824,156 A * 10/1998 Watanabe ........... B05C 11/1047
118/410
2004/0009396 A1 * 1/2004 Kim .................... H01M 4/1397
429/212
(Continued)

FOREIGN PATENT DOCUMENTS

CN 105118996 A 12/2015
JP 107-29605 A 1/1995
(Continued)

OTHER PUBLICATIONS

Chiappisi, "Polyoxyethylene alkyl ether carboxylic acids: An overview of a neglected class of surfactants with multiresponsive properties," Oct. 13, 2017, Advances in Colloid and Interface Science, 250, 79-94. (Year: 2017).*
(Continued)

*Primary Examiner* — Matthew W Van Oudenaren
(74) *Attorney, Agent, or Firm* — WHDA, LLP

(57) ABSTRACT

A positive electrode slurry including a positive electrode material mixture and a dispersion medium for dispersing the positive electrode material mixture. The positive electrode material mixture contains a positive electrode active material, an electrically conductive agent, a binder, and an additive. The additive includes a compound intramolecularly having a polyether group and an acidic group.

9 Claims, 2 Drawing Sheets

(51) Int. Cl.
    *H01M 4/36*     (2006.01)
    *H01M 4/62*     (2006.01)
    *H01M 10/0525*     (2010.01)

(52) U.S. Cl.
    CPC ............ *H01M 4/0409* (2013.01); *H01M 4/62* (2013.01); *H01M 10/0525* (2013.01)

(56) References Cited

U.S. PATENT DOCUMENTS

| | | | |
|---|---|---|---|
| 2004/0076878 A1* | 4/2004 | Ndzebet | H01M 4/244 252/182.1 |
| 2006/0099505 A1 | 5/2006 | Fujino et al. | |
| 2007/0055023 A1 | 3/2007 | Han et al. | |
| 2009/0098457 A1* | 4/2009 | Kwon | H01M 10/052 427/535 |
| 2015/0243964 A1* | 8/2015 | Yu | H01M 4/1391 429/233 |
| 2016/0204407 A1* | 7/2016 | Kai | H01M 10/0525 429/144 |

FOREIGN PATENT DOCUMENTS

| | | | |
|---|---|---|---|
| JP | H0729605 | * | 1/1995 |
| JP | H08-229481 A | | 9/1996 |
| JP | 2004-146253 A | | 5/2004 |
| JP | 2006-519883 A | | 8/2006 |
| JP | 2011-014457 A | | 1/2011 |
| JP | 2013-134884 A | | 7/2013 |
| JP | 2014-130702 A | | 7/2014 |
| JP | 2014-176824 A | | 9/2014 |
| JP | 2015-106499 A | | 6/2015 |
| TW | 201601372 | * | 1/2016 |

OTHER PUBLICATIONS

Lee et al., "Synthesis and Characterization of TRITON X-Based Surfactants with Carboxylic or Amino Groups in the Oxyethylene Chain End," 2007, Journal of Applied Polymer Science, vol. 104, 162-170. (Year: 2007).*

English Translation of International Search Report dated Feb. 18, 2020, issued in counterpart Application No. PCT/JP2019/046699. (2 pages).

* cited by examiner

POSITIVE ELECTRODE SLURRY, POSITIVE ELECTRODE, SECONDARY BATTERY, AND POSITIVE ELECTRODE MANUFACTURING METHOD

TECHNICAL FIELD

The present disclosure relates to a positive electrode slurry, a positive electrode, a secondary battery, and a method for producing a positive electrode.

BACKGROUND ART

A secondary battery represented by a lithium ion secondary battery includes a positive electrode, a negative electrode, and an electrolyte. The positive electrode usually includes a current collector sheet, and a positive electrode material mixture layer supported on the current collector sheet. The positive electrode material mixture layer is formed by applying a positive electrode slurry onto a surface of the current collector sheet, followed by drying. The positive electrode slurry includes a positive electrode material mixture containing a positive electrode active material and others, and a dispersion medium for dispersing the positive electrode material mixture.

Patent Literature 1 discloses an application apparatus including a vibration generator attached to the lip tip of the coating head. The vibration generator transmits vibration to the lip tip. This can effectively stop the dripping of the coating liquid ejected from the lip tip toward an article to be coated, and thus to suppress the stringiness at the application end point on the article to be coated. The application apparatus disclosed in Patent Literature 1 can be used for application of a positive electrode slurry onto a current collector sheet.

Citation List

Patent Literature

[PTL 1] Japanese Laid-Open Patent Publication No. 2014-176824

SUMMARY OF INVENTION

In the application apparatus disclosed in Patent Literature 1, however, the vibration generator needs to be separately installed, which complicates the application apparatus. The operation of the application apparatus is also complicated. Examples of the operation required include turning on and off of the vibration generation, adjusting the level of vibration, and adjusting the timing of vibration generation. Therefore, the improvement in productivity and the reduction of production cost of a positive electrode have been difficult to achieve. Especially when attempting to upsize the application apparatus or speed up the application process, a special vibration generator is necessary to use, which may increase the production cost of a positive electrode.

An object of the present disclosure is to provide a positive electrode slurry that can suppress the stringiness at the application end point, as compared to when using the conventional positive electrode slurry.

In view of the above, a first aspect of the present disclosure relates to a positive electrode slurry, including: a positive electrode material mixture; and a dispersion medium for dispersing the positive electrode material mixture, the positive electrode material mixture containing a positive electrode active material, an electrically conductive agent, a binder, and an additive, the additive including a compound intramolecularly having a polyether group and an acidic group.

A second aspect of the present disclosure relates to a positive electrode, including: a current collector sheet; and a positive electrode material mixture layer supported on the current collector sheet, the positive electrode material mixture layer being formed using the positive electrode slurry according to the first aspect of the present disclosure.

A third aspect of the present disclosure relates to a secondary battery, including: a positive electrode; a negative electrode; and an electrolyte, the positive electrode being the positive electrode according to the second aspect of the present disclosure.

A fourth aspect of the present disclosure relates to a method for producing a positive electrode, the method including: a first step of preparing the positive electrode slurry according to the first aspect of the present disclosure; and a second step of applying the positive electrode slurry onto a surface of the current collector sheet, followed by drying, to form a positive electrode material mixture layer.

According to the present disclosure, it is possible to provide a positive electrode slurry that can reduce the stringiness at the application end point.

DESCRIPTION OF EMBODIMENTS

[Positive Electrode Slurry]

A positive electrode slurry according to the preset disclosure includes a positive electrode material mixture, and a dispersion medium for dispersing the positive electrode material mixture. The positive electrode material mixture contains a positive electrode active material, an electrically conductive agent, a binder, and an additive. The additive includes a compound having, in its molecule, a polyether group and an acidic group (hereinafter, a compound A).

Figure 1:
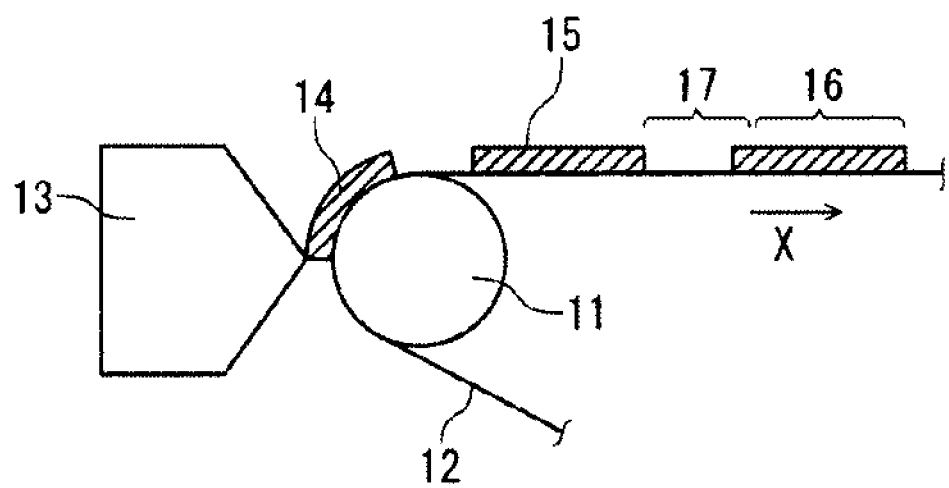
FIG. 1 A schematic view of an essential part showing an example of an application process of a positive electrode slurry.
Figure 2:
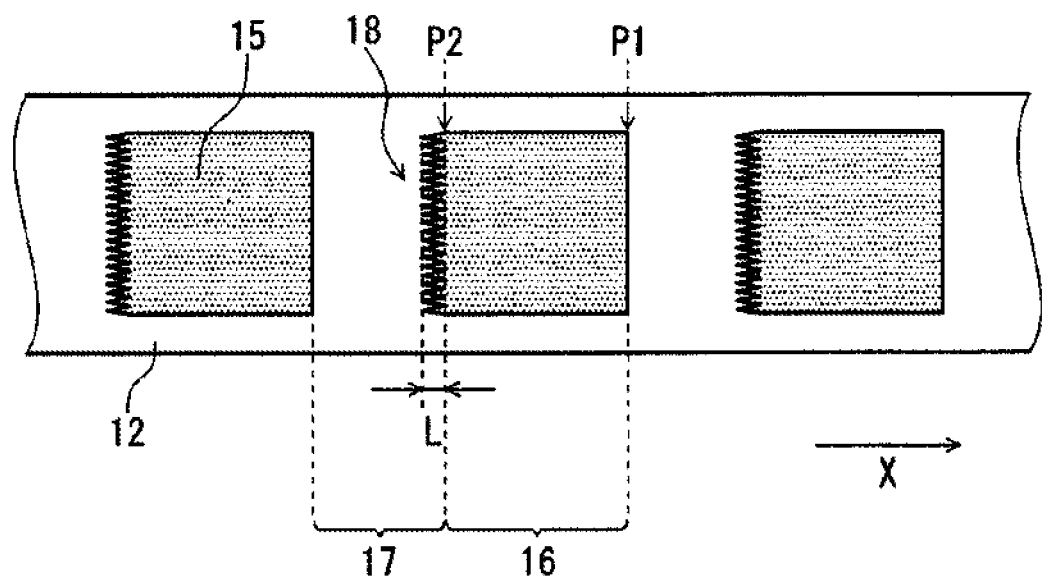
FIG. 2 A schematic view showing an applied state of the positive electrode slurry on a surface of a current collector sheet.

FIG. 1 is a schematic view of an essential part showing an example of an application process of a positive electrode slurry. FIG. 1 illustrates an essential part of an intermittent application process using a positive electrode slurry 14. FIG. 2 is a schematic view showing an applied state of the positive electrode slurry on a surface of a current collector sheet. The arrow X in FIGS. 1 and 2 indicates the conveying direction of a current collector sheet 12.

While the current collector sheet 12 having a belt-like shape is conveyed in the X direction by the rotation of a roll 11, the positive electrode slurry 14 is ejected intermittently from a coating head 13 of an application apparatus toward the current collector sheet 12. At an application start point P1, the ejection of the positive electrode slurry 14 from the coating head 13 is started, and at an application end point P2, the ejection of the positive electrode slurry 14 from the coating head 13 is stopped. In this way, the positive electrode slurry 14 is applied intermittently onto the current collector sheet 12. As a result, as illustrated in FIG. 2, an applied film 15 is intermittently formed on the current collector sheet 12, so that the current collector sheet 12 has a plurality of alternately formed applied-regions 16 and non-applied-regions 17. The applied region 16 refers to a region from the application start point P1 to the application end point P2. The non-applied region 17 is used in a later process, for example, for welding of a positive electrode lead and/or separation into each positive electrode for one battery.

Usually, even when the ejection of the positive electrode slurry 14 from the coating head 13 is stopped, due to the surface tension of the positive electrode slurry 14, the applied film 15 extends further from the coating head 13, and the positive electrode slurry 14 extends from the application end point P2 toward the non-applied region 17 adjacent to the P2 along the conveying direction X, which is prone to leave a stringiness 18 consisting of one or more traces. When the length L of the stringiness 18 is large, welding failure of the positive electrode lead may occur in the non-applied region, and the reliability of the positive electrode may decrease.

To address this, in the present disclosure, the compound A is included in the positive electrode slurry. This can suppress the stringiness at the application end point. Specifically, the length L of the stringiness 18 as shown in FIG. 2 can be reduced, or application can be made with no stringiness 18 left. By suppressing the stringiness, a positive electrode excellent in reliability can be obtained.

Moreover, since the stringiness as above can be suppressed by the addition of the compound A in the positive electrode slurry, the installation of a vibration generator in the application apparatus in not necessary, and the complication of the application apparatus and its operation can be avoided. Thus, the improvement in productivity and the reduction of production cost of the positive electrode can be achieved. Also, the upsizing of the application apparatus and the speeding-up of the application can be made at low cost.

(Compound A)

The compound A has, in its molecule, a polyether group and an acidic group. The acidic group includes a carboxyl group, a sulfonic acid group, a phosphoric acid group, a phosphoric acid ester group, and the like. The polyether group includes a polyalkylene oxide group, and the like. The polyalkylene oxide group includes polyethylene oxide (PEO), polypropylene oxide (PPO), a copolymer of ethylene oxide (EO) and propylene oxide (PO), and the like. The copolymer may be a block copolymer, and may be a random copolymer. The compound A may have a linking group between the polyether group and the acidic group. Specific examples of the compound A includes a polyether acid.

In view of suppressing the stringiness as above, the content of the compound A in the positive electrode slurry is preferably 0.1 parts by mass or more, more preferably 0.3 parts by mass or more, further more preferably 0.6 parts by mass or more, per 100 parts by mass the positive electrode active material. In view of securing the positive electrode capacity (positive electrode active material amount), the content of the compound A in the positive electrode slurry is, for example, 5.0 parts by mass or less, per 100 parts by mass of the positive electrode active material.

(Positive Electrode Material Mixture)

The positive electrode material mixture contains a positive electrode active material capable of electrochemically absorbing and releasing lithium ions, an electrically conductive agent, a binder, and the aforementioned compound A.

As the positive electrode active material, for example, a lithium-containing composite oxide containing a transition metal element, such as Ni, Co, and Mn, can be used. Examples of the lithium-containing composite oxide include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, and $Li_2MPO_4F$. Here, M is at least one selected from the group consisting of Na, Mg, Sc, Y, Mn, Fe, Co, Ni, Cu, Zn, Al, Cr, Pb, Sb, and B, and $0<a\le1.2$, $0<b\le0.9$, and $0\le c\le2.3$. The value "a" representing the molar ratio of lithium is subjected to increase and decrease during charge and discharge.

Examples of the conductive agent include: carbons, such as acetylene black, carbon black, and carbon nanotubes; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. When used in the positive electrode material mixture, the conductive agent may be graphite, such as natural graphite and artificial graphite. The conductive agent may be used singly or in combination of two or more kinds.

The binder may be a resin material, examples of which include: fluorocarbon resin, such as polytetrafluoroethylene and polyvinylidene fluoride; polyolefin resin, such as polyethylene and polypropylene; polyamide resin, such as aramid resin; polyimide resin, such as polyimide and polyamide-imide; acrylic resin, such as polyacrylic acid, polymethyl acrylate, and ethylene-acrylic acid copolymer; vinyl resin, such as polyacrylonitrile and polyvinyl acetate; and a rubbery material, such as styrene-butadiene copolymer rubber (SBR). The binder may be used singly or in combination of two or more kinds.

(Dispersion Medium)

The dispersion medium is not specifically limited and is exemplified by water, alcohols such as ethanol, ethers such as tetrahydrofuran, amides such as dimethylformamide, and N-methyl-2-pyrrolidone (NMP).

[Method for Producing Positive Electrode]

A method for producing a positive electrode according to an embodiment of the present disclosure includes a first step of preparing a positive electrode slurry, and a second step of applying the positive electrode slurry onto a surface of the current collector sheet, followed by drying, to form a positive electrode material mixture layer. The positive electrode material mixture layer may be formed on one surface or both surfaces of the current collector sheet. The above production method may further include a step of rolling the positive electrode material mixture layer.

(First Step)

In the first step, materials of a positive electrode material mixture are fed into a dispersion medium, and then, a mixture of the positive electrode material mixture and the dispersion medium is stirred. In this way, the compound A can be easily contained in the positive electrode slurry.

(Second Step)

The second step includes a 2A step of applying the positive electrode slurry onto a surface of a current collector sheet, and a 2B step of drying an applied film attached to the surface of the current collector sheet, and to form a positive electrode material mixture layer.

(2A Step)

In the 2A step, while a current collector sheet having a belt-like shape is conveyed, the positive electrode slurry may be intermittently applied onto a surface of the current collector sheet. In the intermittent application, a large number of the application end points are formed repetitively on the surface of the current collector sheet. Therefore, the stringiness suppression can be remarkable when using the positive electrode slurry as mentioned above.

For conveying the current collector sheet, a roll or the like may be used. The conveying speed of the current collector sheet may be adjusted by, for example, changing the number of rotation of the roll. The conveying speed of the current collector sheet is, for example, 10 m/min or more and 100 m/min or less. Examples of the application apparatus include a die coater.

(2B Step)

In the 2B step, the applied film is dried to remove the dispersion medium therefrom. After drying the applied film and then rolling the dry applied film between pressure rolls, the positive electrode material mixture layer has a thickness of, for example, 10 µm or more and 100 µm or less. When the positive electrode slurry is intermittently applied in the 2A step, in the 2B step, the positive electrode material mixture layer is intermittently formed on the current collector sheet. In other words, the current collector sheet has a plurality of alternately formed regions where the positive electrode material mixture layer is formed and regions where no positive electrode material mixture layer is formed.

The aforementioned production method may further include a step of cutting an electrode plate obtained in the second step including a current collector sheet and a positive electrode material mixture layer formed on a surface of the current collector sheet, at predetermined intervals. This can provide a plurality of positive electrodes each including a current collector sheet and a positive electrode material mixture layer supported on the current collector sheet. When the positive electrode slurry is intermittently applied in the 2A step, the current collector sheet may be cut somewhere in the region where the positive electrode material mixture layer is formed, together with the positive electrode material mixture layer. The current collector sheet may be cut somewhere in the region where no positive electrode material mixture layer is formed.

(Current Collector Sheet)

The current collector sheet may be, for example, a non-porous electrically conductive substrate (e.g., metal foil), and a porous electrically conductive substrate (e.g., mesh, net, punched sheet).

Examples of the material of the current collector sheet for the positive electrode include stainless steel, aluminum, an aluminum alloy, and titanium. The current collector sheet for the positive electrode has a thickness of, for example, 10 µm or more and 15 µm or less.

[Positive Electrode]

An electrode according to an embodiment of the present disclosure includes a current collector sheet, and a positive electrode material mixture layer supported on the current collector sheet. The positive electrode material mixture layer is formed using the aforementioned positive electrode slurry. The positive electrode material mixture layer is usually formed by applying a positive electrode slurry onto a surface of a current collector sheet, followed by drying. That is, the positive electrode is obtained by the aforementioned production method.

[Secondary Battery]

A secondary battery according to an embodiment of the present disclosure includes a positive electrode, a negative electrode, and an electrolyte. The positive electrode is obtained using the aforementioned positive electrode slurry.

The compound A in the positive electrode material mixture may slightly remain in the positive electrode material mixture within the battery.

A detailed description will be given below of a secondary battery according to an embodiment of the present disclosure.

(Positive Electrode)

The positive electrode includes, for example, a positive electrode current collector (current collector sheet) and a positive electrode material mixture layer formed on a surface of the positive electrode current collector. The positive electrode material mixture layer can be formed by applying the aforementioned positive electrode slurry onto a surface of the positive electrode current collector, followed by drying. The positive electrode material mixture layer contains a positive electrode active material, a binder, an electrically conductive agent, and the compound A. The positive electrode material mixture layer may be formed on one surface or both surfaces of the positive electrode current collector.

(Negative Electrode)

The negative electrode includes, for example, a negative electrode current collector (current collector sheet) and a negative electrode material mixture layer formed on a surface of the negative electrode current collector. The negative electrode material mixture layer can be formed by applying a negative electrode slurry including a negative electrode material mixture dispersed in a dispersion medium, onto a surface of the negative electrode current collector, followed by drying. Examples of the dispersion medium are as those exemplified for the positive electrode slurry. After drying the applied film and then rolling the dry applied film between pressure rolls, the negative electrode material mixture layer has a thickness of, for example, 10 µm or more and 100 µm or less. The negative electrode material mixture layer may be formed on one surface or both surfaces of the negative electrode current collector. The negative electrode material mixture layer contains, for example, a negative electrode active material, a binder, and a thickener.

Examples of the negative electrode active material include, a carbon material, silicon, a silicon compound such as a silicon oxide, and a lithium alloy containing at least one selected from the group consisting of tin, aluminum, zinc, and magnesium. Examples of the carbon material include graphite (e.g., natural graphite, artificial graphite) and amorphous carbon.

Examples of the binder are as those exemplified for the positive electrode material mixture. Examples of the thickener include carboxymethyl cellulose (CMC) and modified products thereof (including salts, such as Na salt).

Examples of the current collector sheet include a non-porous electrically conductive substrate (e.g., metal foil) and a porous electrically conductive substrate (e.g., mesh, net, punched sheet). Examples of the material of the current collector sheet for the negative electrode include stainless steel, nickel, a nickel alloy, copper, and a copper alloy. The current collector sheet for the negative electrode has a thickness of, for example, 3 µm or more and 50 µm or less.

(Electrolyte)

The electrolyte may be a liquid electrolyte in which a solute, such as a lithium salt, is dissolved in a solvent. As the solvent, a non-aqueous solvent can be used, and water may be used. The electrolyte may be a solid electrolyte.

The electrolyte contains, for example, a non-aqueous solvent and a lithium salt dissolved in the non-aqueous solvent. The concentration of the lithium salt in the electrolyte is preferably, for example, 0.5 mol/L or more and 2 mol/L or less. When the concentration of the lithium salt is in the range as above, the electrolyte obtained can have excellent ion conductivity and moderate viscosity. The lithium salt concentration, however, is not limited to the above.

As the non-aqueous solvent, for example, a cyclic carbonic acid ester, a chain carbonic acid ester, a cyclic carboxylic acid ester, and the like can be used. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). Examples of the chain carbonic acid ester include methyl formate, ethyl formate, propyl formate, methyl acetate, ethyl acetate, propyl acetate, methyl propionate, ethyl propionate, and propyl propionate. The non-aqueous solvent may be used singly or in combination of two or more kinds.

Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(CnF_{2n+1})_x$, where $1<x<6$, and n is 1 or 2, $LiB_{10}Cl_{10}$, LiCl, LiBr, LiI, chloroborane lithium, lithium lower aliphatic carboxylate, borates, and imides. Examples the borates includes $Li_2B_4O_7$ and $Li(B(C_2O_4)F_2)$. Examples of the imides include $LiN(SO_2CF_3)_2$ and $LiN(C_1F_{21+1}SO_2)(C_mF_{2m+1}SO_2)$, where 1 and m are each an integer of 0 or more. The lithium salt may be used singly or in combination of two or more kinds.

(Separator)

Usually, it is desirable to interpose a separator between the positive electrode and the negative electrode. The separator is excellent in ion permeability and has moderate mechanical strength and electrically insulating properties. The separator may be a microporous thin film, a woven fabric, or a nonwoven fabric. The separator is preferably made of, for example, a polyolefin, such as polypropylene or polyethylene. The separator may have on its surface a heat-resistant layer containing an aramid-based resin, ceramics, or the like.

The secondary battery, for example, has a structure in which an electrode group formed by winding the positive electrode and the negative electrode with the separator interposed therebetween is housed in an outer case, together with the electrolyte. The wound-type electrode group may be replaced with a different form of electrode group, for example, a stacked-type electrode group formed by stacking the positive electrode and the negative electrode with the separator interposed therebetween. The secondary battery may be in any form, such as cylindrical type, prismatic type, coin type, button type, or laminate type.

Figure 3:
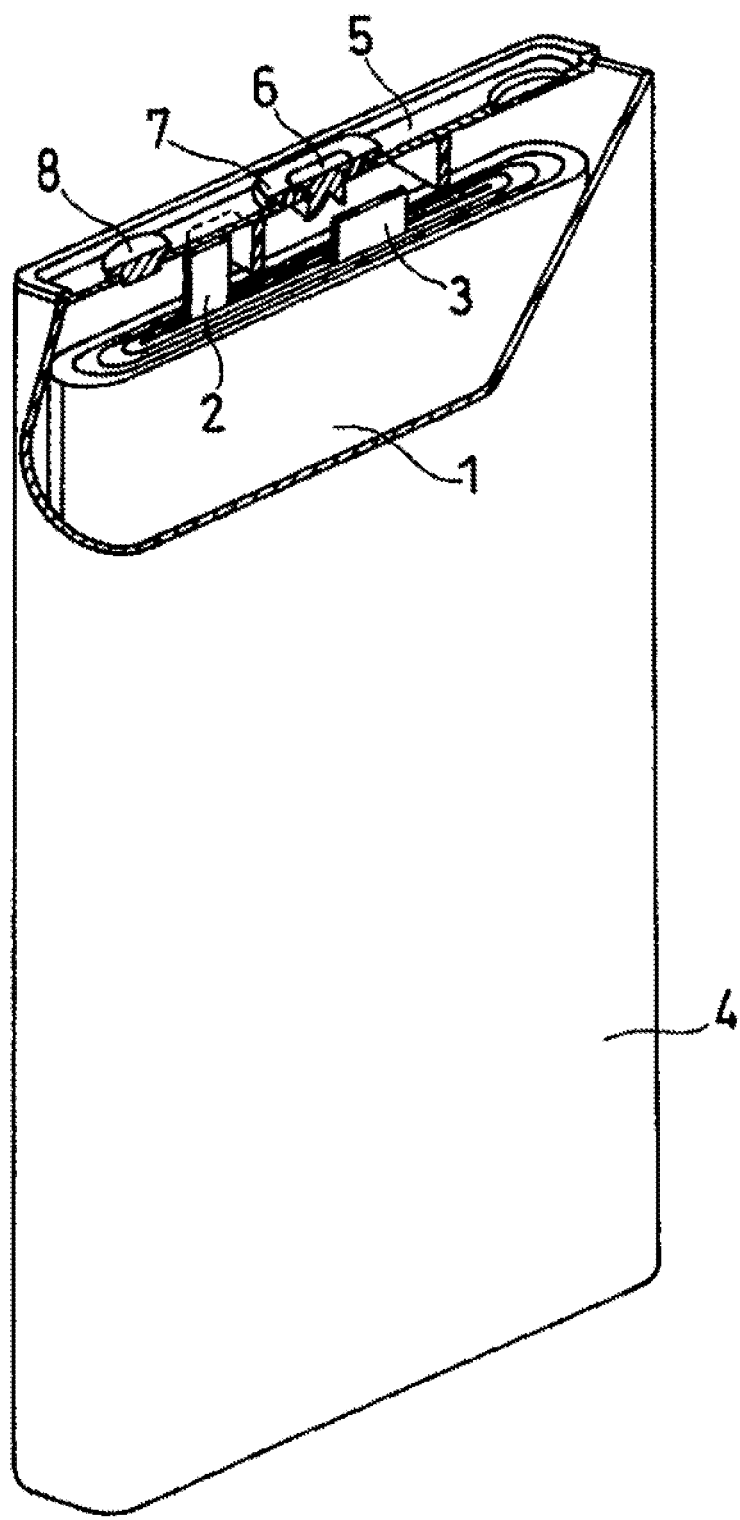
FIG. 3 A partially cut-away schematic oblique view of a secondary battery according to an embodiment of the present disclosure.

A description will be given below of the structure of a prismatic secondary battery according to an embodiment of the present disclosure, with reference to FIG. 3. FIG. 3 is a partially cut-away schematic oblique view of a secondary battery according to an embodiment of the present disclosure.

The battery includes a bottomed prismatic battery case 4, and an electrode group 1 and an electrolyte (not shown) housed in the battery case 4. The electrode group 1 has a long negative electrode, a long positive electrode, and a separator interposed therebetween and preventing the positive and negative electrodes from directly contacting with each other. The electrode group 1 is formed by winding the negative electrode, the positive electrode, and the separator around a flat plate-like winding core, and then removing the winding core. The positive electrode is formed by the production method of a positive electrode according to an embodiment of the present disclosure.

A negative electrode lead 3 is attached at its one end to the negative electrode current collector of the negative electrode, by means of welding or the like. The negative electrode lead 3 is electrically connected at its other end, via an electrically insulating plate (not shown) made of resin, to a negative electrode terminal 6 disposed at a sealing plate 5. The negative electrode terminal 6 is electrically insulated from the sealing plate 5 by the resin gasket 7. A positive electrode lead 2 is attached at its one end to the positive electrode current collector of the positive electrode, by means of welding or the like. The positive electrode lead 2 is electrically connected at its other end, via the insulating plate, to the back side of the sealing plate 5. In other words, the positive electrode lead 2 is electrically connected to the battery case 4 serving as a positive electrode terminal. The insulating plate separates the electrode group 1 from the sealing plate 5, and separates the negative electrode lead 3 from the battery case 4. The sealing plate 5 is fitted at its periphery to the opening end of the battery case 4, and the fitted portion is laser-welded. In this way, the opening of the battery case 4 is sealed with the sealing plate 5. The electrolyte injection hole provided in the sealing plate 5 is closed with a sealing stopper 8.

EXAMPLES

The present disclosure will be specifically described below with reference to Examples and Comparative Examples. It is to be noted, however, the present invention is not limited to the following Examples.

Example 1

(1) Preparation of Positive Electrode Slurry

A dispersion medium was added to a positive electrode active material, a binder, and an electrically conductive agent (i.e., positive electrode material mixture) and stirred together using a mixer (T.K. HIVIS MIX, available from PRIMIX Corporation), to prepare a positive electrode slurry.

For the positive electrode active material, a powder of lithium-containing composite oxide (average particle diameter: 10 μm) was used. For the binder, a powder of polyvinylidene fluoride was used. For the conductive agent, a powder of acetylene black was used. For the additive, a polyether acid (HIPLAAD ED420, available from Kusumoto Chemicals, Ltd.) was used as a compound A. For the dispersion medium, N-methyl-2-pyrrolidone was used. The positive electrode active material, the conductive agent, and the binder were blended in a ratio (mass ratio) of 95:2.5:2.5. The polyether acid was contained in the positive electrode slurry in an amount of 0.6 parts by mass per 100 parts by mass of the positive electrode active material.

(2) Formation of Positive Electrode Material Mixture Layer

Using the positive electrode slurry obtained in the above, an intermittent application as illustrated in FIG. 1 was performed. Specifically, while a belt-like current collector sheet was conveyed by the rotation of a roll, the positive electrode slurry obtained in the above was ejected intermittently onto a surface of the current collector sheet, using an application apparatus. Thereafter, an applied film was heated to dry at 100° C., to form a positive electrode material mixture layer.

For the current collector sheet, aluminum foil (thickness: 15 μm) was used. The rotation rate of the roll was adjusted so that the current collector sheet was conveyed at a rate of 20 m/min. For the application apparatus, a slit-type die coater was used. The clearance between the die head and the roll was set to 200 μm. The intermittent application was performed such that, on the current collector, the length of each of the applied regions (the length in the conveying direction) became 200 mm, and the length of each of the non-applied regions (the length in the conveying direction) became 50 mm.

[Evaluation]

With respect to the positive electrode material mixture layer (dry applied film) formed intermittently in the above, the length L of the stringiness at the application end point was determined. Specifically, three application end points were selected at random from a plurality of application end points formed intermittently. The length of the stringiness at each of the three application end points was measured, and an average of the measured values was determined as the above length L.

The length of the stringiness at each of the application end points was determined as follows. When the number N of the traces of the stringiness at one application end point was one, the length of the one trace was measured as the length of the stringiness at the one application end point. When the number N of the traces of the stringiness at one application end point was two or more and 20 or less, the length of each of the N traces was measured, and an average of the measured values was determined as the length of the stringiness at the one application end point. When the number N of the traces of the stringiness at one application end point was 21 or more, 20 traces were sequentially selected around the center of the applied film. The length of each of the 20 traces was measured, and an average of the measured values was determined as the length of the stringiness at the one application end point. The length of each trace refers to a length in the application direction (in the current collector sheet conveying direction) measured in the area including the trace at the application end point, and represents the length from the origin to the tip of the trace.

Comparative Example 1

A positive electrode material mixture layer was formed and evaluated in the same manner as in Example 1, except that a polycarboxylic acid (HIPLAAD ED111, available from Kusumoto Chemicals, Ltd.,) was used in place of the polyether acid.

Comparative Example 2

A positive electrode material mixture layer was formed and evaluated in the same manner as in Example 1, except that an amine mixture (HIPLAAD ED120, available from Kusumoto Chemicals, Ltd.,) was used in place of the polyether acid.

Comparative Example 3

A positive electrode material mixture layer was formed and evaluated in the same manner as in Example 1, except that no polyether acid was contained in the positive electrode slurry.

The evaluation results of Example 1 and Comparative Examples 1 to 3 are shown in Table 1. In Table 1, the length L of the stringiness is shown as a relative value against that in Comparative Example 3 which is taken as 100.

TABLE 1

|  | Additive | Length L of stringiness at application end point (relative value) |
|---|---|---|
| Ex. 1 | Polyether acid | 66 |
| Com. Ex. 1 | Polycarboxylic acid | 83 |
| Com. Ex. 2 | Amine mixture | 100 |
| Com. Ex. 3 | Without | 100 |

In Example 1 in which a polyether acid was contained in the positive electrode slurry, the length L of the stringiness was small as compared to in Comparative Examples 1 to 3.

INDUSTRIAL APPLICABILITY

The positive electrode slurry according to the present disclosure is preferably used for the production of a positive electrode which is required to have high reliability.

REFERENCE SIGNS LIST

1: electrode group, 2: positive electrode lead, 3: negative electrode lead, 4: battery case, 5: sealing plate, 6: negative electrode terminal, 7: gasket, 8: sealing stopper, 11: roll, 12: current collector sheet, 13: coating head, 14: positive electrode slurry, 15: applied film, 16: applied region, 17: non-applied region, 18: stringiness, P1: application start point, P2: application end point

The invention claimed is:

1. A positive electrode slurry, comprising:
a positive electrode material mixture; and an organic dispersion medium as a sole dispersion medium for dispersing the positive electrode material mixture, wherein the organic dispersion medium is an organic compound,
the positive electrode material mixture comprising: a lithium-containing composite oxide containing a transition metal element as a positive electrode active material; an electrically conductive agent; a binder; and an additive,
the additive including a compound intramolecularly having a polyether group and an acidic group and free of an amine, wherein
the acidic group includes at least a sulfonic acid group.

2. The positive electrode slurry according to claim 1, wherein the polyether group includes a polyalkylene oxide group.

3. The positive electrode slurry according to claim 1, wherein a content of the compound is 0.1 parts by mass or more per 100 parts by mass of the positive electrode active material.

4. A positive electrode, comprising:
a current collector sheet; and a positive electrode material mixture layer supported on the current collector sheet, the positive electrode material mixture layer being formed using the positive electrode slurry according to claim 1.

5. A secondary battery, comprising:
a positive electrode; a negative electrode; and an electrolyte,
the positive electrode being the positive electrode according to claim 4.

6. A method for producing a positive electrode, the method comprising:
a first step of preparing the positive electrode slurry according to claim 1; and a second step of applying the positive electrode slurry onto a surface of a current collector sheet, followed by drying, to form a positive electrode material mixture layer.

7. The method for producing a positive electrode according to claim 6, wherein in the second step, while the current collector sheet having a belt-like shape is conveyed, the positive electrode slurry is intermittently applied onto the surface of the current collector sheet.

8. The positive electrode slurry according to claim 1, wherein the organic dispersion medium consists essentially of N-methyl-2-pyrrolidone.

9. The positive electrode slurry according to claim 1, wherein the polyether group includes at least one or both of polypropylene oxide (PPO), and a copolymer of ethylene oxide (EO) and propylene oxide (PO).

* * * * *